United States Patent [19]

Avakian et al.

[11] Patent Number: 5,019,616
[45] Date of Patent: May 28, 1991

[54] COMPOSITION COMPRISING A POLYPHENYLENE-ETHER-CONTAINING POLYMERIC COMPONENT AND REINFORCING FIBERS

[75] Inventors: Roger W. Avakian, Dalton; Popkin Shenian, Pittsfield, both of Mass.; Jan Bussink, Bergen Op Zoom, Netherlands

[73] Assignee: General Electric Company, Pittsfield, Mass.

[21] Appl. No.: 353,785

[22] Filed: May 16, 1989

[51] Int. Cl.$^5$ ...................... C08K 5/521; C08L 73/00
[52] U.S. Cl. .................... 524/141; 524/493; 524/494; 524/495; 524/496; 524/404; 524/452; 524/540; 524/508; 524/445; 524/449; 524/451
[58] Field of Search .............. 524/493, 494, 495, 496, 524/404, 452, 141, 540, 508, 445, 449, 451

[56] References Cited

U.S. PATENT DOCUMENTS

| | | | |
|---|---|---|---|
| 4,226,761 | 10/1980 | Cooper | 524/494 |
| 4,282,139 | 8/1981 | Akitoshi | 524/452 |
| 4,771,096 | 9/1988 | Bussink | 524/494 |
| 4,874,810 | 10/1989 | Lee, Jr. | 524/494 |
| 4,8922,904 | 1/1990 | Ting | 524/494 |

Primary Examiner—Paul R. Michl
Assistant Examiner—Christopher P. Rogers
Attorney, Agent, or Firm—Ralph H. Dougherty

[57] ABSTRACT

A thermally stable polyphenylene ether composition having long glass fibers of at least 4 mm length incorporated therein. A suitable high temperature binder such as polyethyloxazoline may be included in the composition, as well as a flame retardant additive or other filler.

11 Claims, No Drawings

COMPOSITION COMPRISING A POLYPHENYLENE-ETHER-CONTAINING POLYMERIC COMPONENT AND REINFORCING FIBERS

The present invention relates to a fiber reinforced polyethylene ether resin, having improved properties after aging, particularly after elevated temperature aging.

Polyethylene ethers (herein usually abbreviated as PPE) are a well-known class of important engineering plastics. They have excellent strength properties, but they have also a few drawbacks. In the first place, they embrittle rather quickly in the pure state upon thermal aging, i.e., the impact strength decreases. Thus, in an accelerated aging test at 200° C., pure PPE is embrittled already after 24 hours.

Another problem of PPE is that it is difficult to process in the pure state, and for this reason it is commercially available mainly as mixtures with polystyrene. A range of such products is sold by General Electric Company under the commercial name "Noryl" and these products are formed by mixtures containing usually no more than 80% PPE (down to about 20%) with correspondingly increasing polystyrene contents.

It is generally known to improve the impact strength of a resin by combining it with reinforcing fibers, such as glass or carbon fibers. In Intern. Jour. Polymeric Mater. 1971, Vol. 1, pp. 75–94, K. L. Trachte and A. T. Dibenedetto in an article entitled "Fracture Properties of Polyphenylene Oxide Composites" have reported various experiments with filled and unfilled PPE and concluded that the fracture toughness was relatively independent of filler types and geometry. In their experiments with fiber reinforcements, they used ⅛" fibers.

Quite generally, relatively short fibers have been used for reinforcing purposes, but also methods have been described in the literature with which longer fibers may be combined with a resin. One such reference is European Patent Application EP-A-0148760. According to that reference, a fine foam is prepared from polymer powder, long fibers, and a foaming agent in a floatation cell, and this dispersion is deposited on a paper making machine. In this way a web is obtained of fibers and polymer, and this web is further treated to bond the two components together. In Table 2 of the European application, experiments with "PPO" are mentioned, but in that application, the expression "PPO" is explained to mean "NORYL" sold by General Electric. (In actuality, "NORYL" is modified PPO, generally modified with at least 20 percent styrenic material, and "PPO" is a registered trademark of General Electric Company for essentially pure polyphenylene ether.) Consequently, a mixture of PPE and polystyrene was used, and in actuality the experiments were carried out with a 60-40 PPE-polystyrene mixture. Compared with the other resins in this table (polyethylene terephthalate and polybutylene terephthalate), the results regarding flexural modulus obtained with the "PPO" are clearly inferior to those obtained with the other resins of this table, although they are somewhat superior to those obtained with polypropylene. Judging from these results one can say that NORYL does not behave too badly in this combination, but it is certainly not the best one, particularly with regard to modulus.

It is the principal object of this invention to provide a plastic composition having high impact strength, high flexural strength, and high glass transition temperature, yet which resists embrittlement upon thermal aging.

Surprisingly, it has now been found that compositions of a polymeric component and reinforcing fibers, wherein the polymeric component contains considerably more PPE than the commercial 60-40 PPE-polystyrene mixture, i.e., more than 75% by weight of PPE, and preferably substantially pure PPE, and wherein the fibers have a length of at least 4 mm, show an improved impact resistance and flexural properties, and especially a much slower embrittlement rate at elevated temperatures, thus permitting use at higher temperatures for longer times than before. Equivalent loadings of glass at shorter fiber lengths do not show this dramatic effect. This is a general observation, since the weight ratio between the polymeric component and the fiber component in the compositions according to the present invention is not particularly critical. This ratio may range from 40:60 to 80:20.

We have found that the fibers preferably should have a length of at least 4 millimeters, and their length may be up to 30 mm. Their diameter should be from 2 to 30 microns, but preferably from 5 to 30 $\mu$.

Furthermore, the nature of the reinforcing fibers is not critical and one can use all the usual fibers, such as those of glass or carbon, and other inorganic fibers such as silicon carbide or boron.

Optionally, a heat-resistant binder may be used to improve the adhesion between the polymeric and the fibrous components. Often the mixture of fine powdery PPE, fibers and foaming agent must be conveyed from one place to another and a binder will then also prevent the powder from falling out of the mixture. The thermally stable binder comprises from 0.1 to 20 weight percent of the comparison. Furthermore, the binder is useful in a case wherein, for example, a copper foil is to be bonded to the obtained product. Of course, such a binder should be sufficiently heat resistant and not evolve appreciable amounts of volatiles in order to withstand the usual processing temperatures, since compression molding of PPE products typically occurs at temperatures of 300° to 310° C. An example of a sufficiently heat-resistant binder is a polyethyl oxazoline, available from Dow Chemical Company under the trade name PEOX, which is stable up to about 350° C.

Various methods can be used to produce the compositions of the present invention. The method presently preferred is that set forth in European Patent Application EP-A-0148760, but other available methods can also be used, such as the process disclosed in U.S. Pat. No. 4,426,470, or the process disclosed in European Applications EP-A-0039292 and EP-A-0069650.

The following Table I shows some compositions of the present invention, as well as their flexural strength, flexural modulus and modified Charpy impact (unnotched) in the initial state and after various aging times; aging being carried out in an air circulated oven. A control composition without glass is also shown for comparison, as well as a milled glass fiber example in pure PPE, where the fiber length is about 0.1 mm. In these experiments, a polyphenylene ether was used which is sold by General Electric Company under the commercial (trademarked) name "PPO 803". This is a poly (2.6-dimethyl phenylene) ether having an intrinsic viscosity of 40 ml/g, measured in $CHCl_3$ at 25° C. Glass fiber used was "ECO88" water-dispersible glass (13 mm length, 10$\mu$ diameter) supplied by PPG Ltd. U.K.

Milled glass was "Kurzglass MF7902" supplied by Bayer-Flasfaser.

As will appear from the data of Table I, considerable heat stability with regard to impact retention after heat aging is attained with a loading of b 20% by weight of glass fibers having a fiber length of 13 mm. Note that the short glass fiber compositions show little improvement in impact after thermal aging over the control composition without glass.

TABLE I

PPO 803

| 20% Glass (13 mm); | Initial | 4 weeks heat aging** | 7 weeks heat aging** | 14 weeks heat aging** | 21 weeks heat aging** | 52 weeks heat aging** |
|---|---|---|---|---|---|---|
| Flexural Strength N/mm2 | 165.4 | 124.2 | 130.1 | 122.2 | 87.7 | 54.7 |
| Flexural Modulus N/mm2 | 5110 | 5750 | 5880 | 5390 | 4300 | 4540 |
| Modified Charpy Impact (unnotched) KJ/m2 | 37.9 | 36.2 | 25.8 | 46.5 | 16.1 | 12.6 |

| 30% Glass (13 mm); | Initial | 4 weeks heat aging | 7 weeks heat aging | 14 weeks heat aging | 21 weeks heat aging | 52 weeks heat aging |
|---|---|---|---|---|---|---|
| Flexural Strength N/mm2 | 204 | 180.6 | 172.2 | 135 | 102.4 | 31.7 |
| Flexural Modulus N/mm2 | 7170 | 9660 | 8260 | 6570 | 6360 | 1690 |
| Modified Charpy Impact (unnotched) KJ/m2 | 51.0 | 45.0 | 41.4 | 37.4 | 21.3 | 12.4 |

| 40% Glass (13 mm); | Initial | 4 weeks heat aging | 7 weeks heat aging | 14 weeks heat aging | 21 weeks heat aging | 52 weeks heat aging |
|---|---|---|---|---|---|---|
| Flexural Strength N/mm2 | 193 | 167.3 | 142.1 | 104.6 | 83.7 | 10.1 |
| Flexural Modulus N/mm2 | 7610 | 7650 | 6690 | 5500 | 3450 | 910 |
| Modified Charpy Impact (unnotched) KJ/m2 | 47.3 | 41.1 | 41.7 | 35.5 | 22.4 | 2.8 |

| without Glass | Initial | 1 day heat aging | 3 days heat aging | 6 days heat aging | 17 days heat aging |
|---|---|---|---|---|---|
| Flexural Strength N/mm2 | 79 | — | 83 | 88 | 86.1 |
| Flexural Modulus N/mm2 | 2400 | — | 2700 | 2900 | 3430 |
| Modified Charpy Impact (unnotched) KJ/m2 | >123 | 14.4 | 13.1 | 10.9 | 6.7 |

| 30% Milled Glass Fiber (0.1 mm) | Initial | 4 weeks heat aging | 7 weeks heat aging |
|---|---|---|---|
| Flexural Strength N/mm2 | 107.6 | 91.1 | 81.4 |
| Flexural Modulus N/mm2 | 4660 | 5740 | 5540 |
| Modified Charpy Impact (unnotched) KJ/m2 | 15.6 | 6.9 | 6.7 |

**all heat aging at 180 C. in an air-circulated oven

In order to demonstrate the wide applicability of this invention, some further comparative experiments were carried out with an 80/20 and with a 95/5 PPE/polystyrene mixture, In one case the 80/20 mixture was formulated with 30% glass fibers of 13 mm, and in a second experiment it was formulated with 30% of the usual short glass fibers. The aging tests were carried out at 180° C. A material which is stable at this temperature over a long period of time is highly suitable for use in gas scrubbers. The material containing the short glass fibers was already too brittle after one week. Especially useful in this respect is the 95/5 mixture. It should be noted that a 50/50 mixture of the PPE and polystyrene cannot be tested at 180° C., because it softens at a lower temperature.

TABLE 2

THERMAL AGING OF CHOPPED GLASS FIBER COMPOSITES

| | Initial | 1 week 180° C. | 2 weeks 180° C. | 5 weeks 180° C. |
|---|---|---|---|---|
| PPO/PS (80/20) 30% (13 MM) | | | | |
| Flexural Strength N/mm² | 184 | 107 | 90 | 89 |
| Flexural Modulus N/mm² | 7000 | 5000 | 4200 | 5600 |
| Modified Charpy Impact (unnotched) KJ/m² | 36 | 21.5 | 21 | 17 |
| PPO/PS (80/20) 30% short glass | | | | |
| Flexural Strength N/mm² | 113 | 67 | 63 | 61 |
| Flexural Modulus N/mm² | 4100 | 4100 | 4500 | 5800 |
| Modified Charpy Impact (unnotched) KJ/m² | 12 | 5 | 5 | 5 |
| PPO/PS (95/5) 30% 13 mm fibers | | | | |
| Flexural Strength N/mm² | 207 | 200 | 180 | 176 |
| Flexural Modulus N/mm² | 7000 | 7700 | 6200 | 8650 |
| Modified Charpy Impact KJ/m² | 43 | 40 | 30 | 36 |

One alternative embodiment of this invention is a fiber reinforced PPE composition which includes up to 15% by weight of a flame retardant additive, such as brominated polystyrene or aromatic phosphte esters.

Another alternative embodiment is a fiber reinforced PPE composition in which up to 20% weight of the glass is replaced by fillers, such as talc, mica, or clay. Further, polymers other than polystyrene can form up to 20% by weight of the composition.

We claim:

1. A composition having improved long term heat aging, comprising a polyphenylene ether (PPE)-containing polymeric component, reinforcing fibers having a length of at from 4 to 30 mm, and a polyethyl oxazoline binder, the polymeric component containing more than 75% by weight of substantially pure PPE.

2. A composition according to claim 1, wherein the fibers have a length of about 13 nm.

3. A composition according to claim 1 wherein the weight ratio between the polymeric component and the fiber component is from 40:60 to 80:20.

4. A composition according to claim 3, further comprising up to 20% by weight of polystyrene.

5. A composition according to claim 4, wherein said flame retardant additive is selected from the group comprising brominated polystyrene and aromatic phosphate esters.

6. A composition according to claim 1, wherein the fibers have a diameter of 2 to 30 microns.

7. A composition according to claim 1, wherein the fibers are glass fibers.

8. A composition according to claim 1, wherein the fibers are carbon fibers.

9. A composition according to claim 1, wherein said polyethyloxazoline binder comprises from 0.1 to 20 weight percent of the composition.

10. A composition according to claim 1, further comprising fillers selected from the group comprising: clay, mica, and talc.

11. A composition according to claim 7, wherein said fillers are present in an amount up to 20% of the glass.

* * * * *